United States Patent
Futae et al.

(10) Patent No.: US 11,841,028 B2
(45) Date of Patent: Dec. 12, 2023

(54) THRUST BEARING DEVICE AND TURBOCHARGER

(71) Applicant: MITSUBISHI HEAVY INDUSTRIES ENGINE & TURBOCHARGER, LTD., Sagamihara (JP)

(72) Inventors: Takaya Futae, Tokyo (JP); Seigi Yano, Tokyo (JP); Shimpei Yokoyama, Tokyo (JP); Tasuku Masuda, Tokyo (JP); Yuya Kojima, Tokyo (JP); Yosuke Dammoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/774,607

(22) PCT Filed: Dec. 4, 2019

(86) PCT No.: PCT/JP2019/047402
§ 371 (c)(1),
(2) Date: May 5, 2022

(87) PCT Pub. No.: WO2021/111543
PCT Pub. Date: Jun. 10, 2021

(65) Prior Publication Data
US 2022/0372987 A1  Nov. 24, 2022

(51) Int. Cl.
*F04D 29/056* (2006.01)
*F02B 39/00* (2006.01)
*F16C 17/04* (2006.01)

(52) U.S. Cl.
CPC .......... *F04D 29/056* (2013.01); *F02B 39/00* (2013.01); *F16C 17/04* (2013.01)

(58) Field of Classification Search
CPC ..... B62J 50/21; B62M 27/02; F01N 13/1805; F01N 2340/06; F02B 2075/025;
(Continued)

(56) References Cited

U.S. PATENT DOCUMENTS 3,484,143 A * 12/1969 Sibley ................... F16C 23/046
384/114
3,895,689 A * 7/1975 Swearingen ............ F16C 17/04
184/6.16
(Continued)

FOREIGN PATENT DOCUMENTS

JP 5-27332 U 4/1993
JP 5-75519 U 10/1993
(Continued)

OTHER PUBLICATIONS

International Preliminary Report on Patentability and Written Opinion of the International Searching Authority for International Application No. PCT/JP2019/047402, dated Jun. 16, 2022, with an English translation.
(Continued)

*Primary Examiner* — Jesse S Bogue
(74) *Attorney, Agent, or Firm* — Birch, Stewart, Kolasch & Birch, LLP

(57) ABSTRACT

A thrust bearing device is provided with: a rotational shaft; a collar member fitted to the rotational shaft and having a first thrust surface; and a thrust member having an insertion hole into which the rotational shaft is inserted and a second thrust surface which is disposed around the insertion hole and faces the first thrust surface of the collar member. The first thrust surface is configured to be inclined with respect to a plane perpendicular to an axis of the rotational shaft so that a distance between the first thrust surface and the second
(Continued)

thrust surface periodically increases and decreases with rotation of the rotational shaft.

9 Claims, 11 Drawing Sheets

(58) Field of Classification Search
CPC .... F02B 37/025; F02B 37/183; F02B 37/186;
F02B 39/14; F02B 37/00; F02B 39/00;
Y02T 10/12; Y02T 10/40; F02D 13/0242;
F02D 2041/1422; F02D 2200/0404; F02D
2200/0406; F02D 2200/101; F02D
2200/703; F02D 23/00; F02D 2400/04;
F02D 41/0007; F02D 41/10; F02D 41/22;
F02D 41/2474; F02D 9/105; F01D
25/186; F02C 6/12; F04D 29/063; F04D
29/102; F04D 29/056; F05D 2220/40;
F16C 17/04; F16C 17/047; F16C
2360/24; F16C 33/1075
See application file for complete search history.

(56) References Cited

U.S. PATENT DOCUMENTS

| | | | | |
|---|---|---|---|---|
| 4,348,065 | A * | 9/1982 | Yoshioka | F16C 17/047 384/121 |
| 4,383,771 | A * | 5/1983 | Freytag | F16C 17/047 384/123 |
| 4,406,466 | A * | 9/1983 | Geary, Jr. | F16J 15/3412 277/400 |
| 4,479,728 | A * | 10/1984 | Miller | F01D 25/168 384/369 |
| 4,501,505 | A * | 2/1985 | Chambers | F16C 17/06 384/305 |
| 5,174,584 | A * | 12/1992 | Lahrman | F01D 11/003 277/400 |
| 5,518,319 | A * | 5/1996 | Selby | F16C 32/0696 384/114 |
| 5,829,338 | A * | 11/1998 | Chrestoff | F16C 17/047 417/269 |
| 6,276,831 | B1 | 8/2001 | Takahashi et al. | |
| 6,827,494 | B2 * | 12/2004 | Aguilar | F16C 17/047 384/123 |
| 9,938,982 | B1 * | 4/2018 | Bischof | F01D 25/16 |
| 10,138,934 | B2 * | 11/2018 | Omori | F16C 27/02 |
| 10,473,207 | B2 | 11/2019 | Nishioka et al. | |
| 10,774,876 | B1 * | 9/2020 | Sundararaman | F01D 25/168 |
| 2008/0075398 | A1 * | 3/2008 | Kimura | F16C 17/04 384/107 |
| 2014/0233873 | A1 | 8/2014 | Hayashi et al. | |
| 2016/0032963 | A1 | 2/2016 | Tsutsumi et al. | |
| 2019/0264732 | A1 | 8/2019 | Amano et al. | |

FOREIGN PATENT DOCUMENTS

| | | |
|---|---|---|
| JP | 11-2136 A | 1/1999 |
| JP | 2000-199520 A | 7/2000 |
| JP | 2002-349551 A | 12/2002 |
| JP | 2014-70514 A | 4/2014 |
| JP | 2014-181774 A | 9/2014 |
| JP | 2015-140909 A | 8/2015 |
| JP | 2015-224676 A | 12/2015 |
| JP | 2017-160967 A | 9/2017 |
| JP | 2018-151030 A | 9/2018 |
| JP | 2019-78363 A | 5/2019 |
| JP | 2019-148307 A | 9/2019 |
| JP | 2019-158033 A | 9/2019 |
| WO | WO 2013/099600 A1 | 7/2013 |

OTHER PUBLICATIONS

International Search Report for International Application No. PCT/JP2019/047402, dated Jan. 28, 2020.
Office Action dated Aug. 8, 2022 issued in counterpart German Application No. 112019007751.1.

* cited by examiner

View X-X

THRUST BEARING DEVICE AND TURBOCHARGER

TECHNICAL FIELD

The present disclosure relates to a thrust bearing device and a turbocharger.

BACKGROUND

A rotational shaft of a turbocharger is subjected to a force (thrust force) to move the rotational shaft in the axial direction, for example. For this reason, the turbocharger is provided with a thrust bearing device for supporting the rotational shaft in the axial direction. As an example of the thrust bearing device, there may be mentioned a thrust bearing device described in Patent Document 1.

In the thrust bearing device of the turbocharger, as described in Patent Document 1, a collar member (thrust bush 10) and a thrust member (thrust disk 11) are in sliding contact with each other to bear the thrust load acting on the rotational shaft.

CITATION LIST

Patent Literature

Patent Document 1: JPH11-2136A

SUMMARY

Problems to be Solved

For example, in the thrust bearing device of the turbocharger, it is desirable to reduce the area of the sliding contact surface which bears the thrust load in order to suppress mechanical loss in the thrust bearing device and improve the transient response of the turbocharger. However, when the area of the sliding contact surface which bears the thrust load is reduced, the load capacity of the thrust load is reduced, which may increase the risk of contact and wear.

In view of the above, an object of at least one embodiment of the present disclosure is to suppress both the mechanical loss in the thrust bearing device and the reduction in load capacity of the thrust load.

Solution to the Problems (1) A thrust bearing device according to at least one embodiment of the present disclosure comprises: a rotational shaft; a collar member fitted to the rotational shaft and having a first thrust surface; and a thrust member having an insertion hole into which the rotational shaft is inserted and a second thrust surface which is disposed around the insertion hole and faces the first thrust surface of the collar member. The first thrust surface is configured to be inclined with respect to a plane perpendicular to an axis of the rotational shaft so that a distance between the first thrust surface and the second thrust surface periodically increases and decreases with rotation of the rotational shaft.

(2) A turbocharger according to at least one embodiment of the present disclosure comprises: a turbine impeller attached to one end of the rotational shaft; a compressor impeller attached to another end of the rotational shaft; and the thrust bearing device having the above configuration (1).

Advantageous Effects

According to at least one embodiment of the present disclosure, it is possible to suppress both the mechanical loss in the thrust bearing device and the reduction in load capacity of the thrust load.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration of Turbocharger 100)

Figure 1:
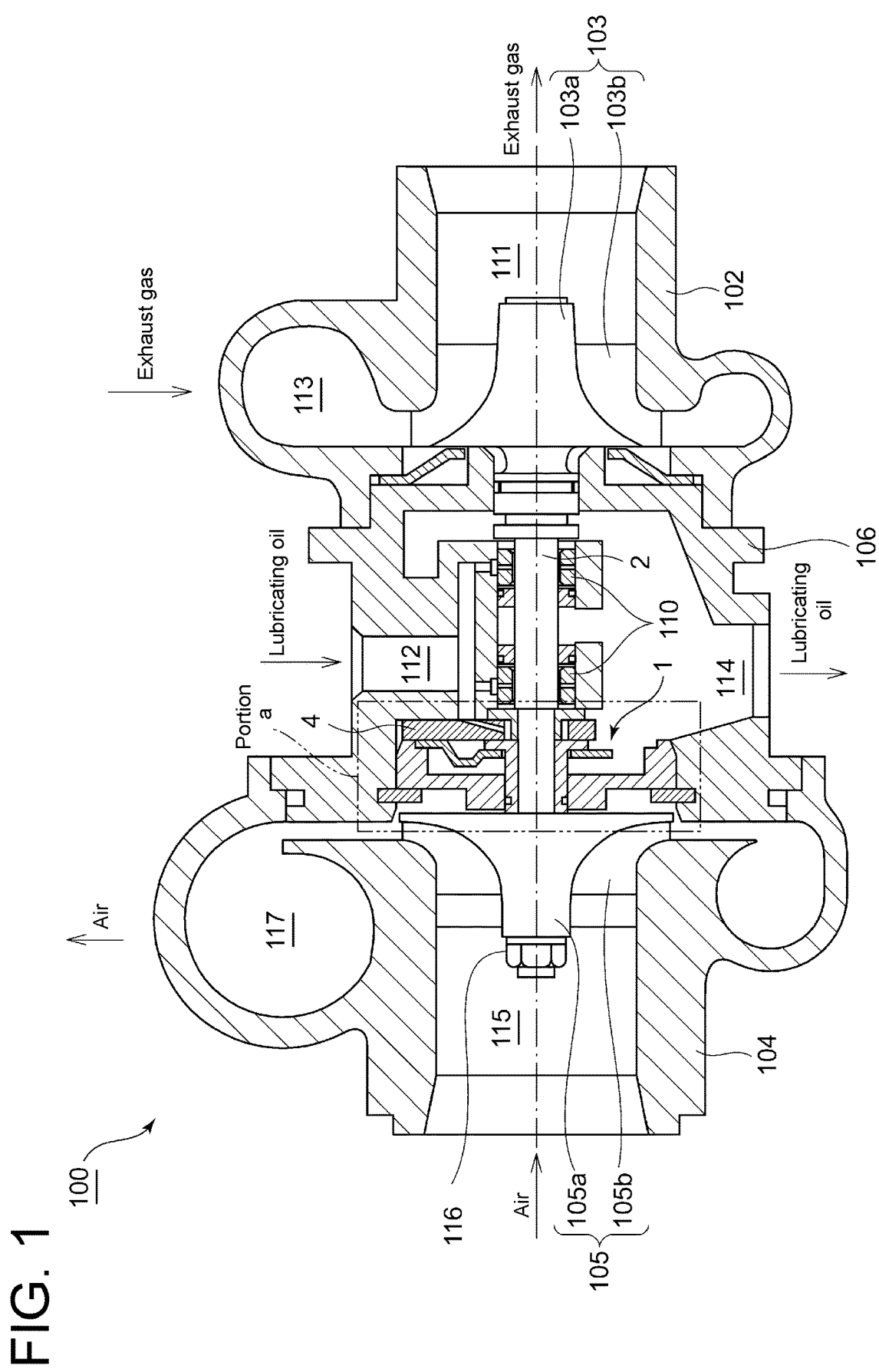
FIG. 1 is a cross-sectional view of a turbocharger taken along the axial direction of a rotational shaft thereof according to an embodiment of the present disclosure.

FIG. 1 is a cross-sectional view of a turbocharger taken along the axial direction of a rotational shaft thereof according to an embodiment of the present disclosure.

A turbocharger according to an embodiment of the present disclosure may be, but is not limited to, a turbocharger mounted to an engine for automobiles, for example.

As shown in FIG. 1, a turbocharger 100 according to the present embodiment includes three housings, namely, a turbine housing 102 for housing a turbine impeller 103 disposed at one end of a rotational shaft 2, a compressor housing 104 for housing a compressor impeller 105 disposed at the other end of the rotational shaft 2, and a bearing housing 106 for housing a radial bearing device 110 for rotatably supporting the rotational shaft 2 and a thrust bearing device 1 for supporting a thrust force of the rotational shaft 2.

In an outer peripheral portion of the turbine housing 102, a turbine scroll passage 113 of spiral shape is formed. The turbine impeller 103 is disposed in the center portion of the turbine scroll passage 113. The turbine impeller 103 is composed of a truncated cone-shaped turbine hub 103a in which the top of a cone is cut off along a plane parallel to the bottom surface, and a plurality of turbine blades 103b provided so as to protrude radially from the peripheral surface of the turbine hub 103a. The turbine hub 103a of the turbine impeller 103 is joined to one end of the rotational shaft 2 by, for example, welding. An exhaust gas flowing through the turbine scroll passage 113 and acting on the turbine impeller 103 is discharged out of the turbine housing 102 through an exhaust gas outlet 111 which opens in the axial direction of the rotational shaft 2.

In an outer peripheral portion of the compressor housing 104, a compressor scroll passage 117 of spiral shape is formed. The compressor impeller 105 is disposed in the center portion of the compressor scroll passage 117. The compressor impeller 105 is composed of a truncated cone-shaped compressor hub 105a in which the top of a cone is cut off along a plane parallel to the bottom surface, and a plurality of compressor blades 105b provided so as to protrude radially from the peripheral surface of the compressor hub 105a. The center portion of the compressor hub 105a of the compressor impeller 105 has a fitting hole (not shown) into which the other end of the rotational shaft 2 is fitted. The compressor impeller 105 is fixed to the other end of the rotational shaft 2 by fitting one end of the rotational shaft 2 into the fitting hole and then tightening a nut 116 from the tip of the compressor hub 105a. An intake gas flowing through an intake gas inlet 115 which opens in the axial direction of the rotational shaft 2 and compressed by the compressor impeller 105 flows through the compressor scroll passage 117 and is supplied to an engine (not shown).

The bearing housing 106 is disposed between the turbine housing 102 and the compressor housing 104 and is coupled at one end to the turbine housing 102 and at the other end to the compressor housing 104. The bearing housing 106 internally forms an interior space through which the rotational shaft 2 can be inserted in the axial direction. The radial bearing device 110 and the thrust bearing device 1 are housed in the interior space. Further, an inlet oil passage 112 for supplying lubricating oil to the radial bearing device 110 and the thrust bearing device 1 is formed on the upper portion of the bearing housing 106. The lubricating oil introduced into the bearing housing 106 through the inlet oil passage 112 lubricates the radial bearing device 110 and the thrust bearing device 1 and is then discharged out of the bearing housing 106 through an outlet oil passage 114 formed on the lower portion of the bearing housing 106.

(Overview of Thrust Bearing Device 1)

Figure 2:
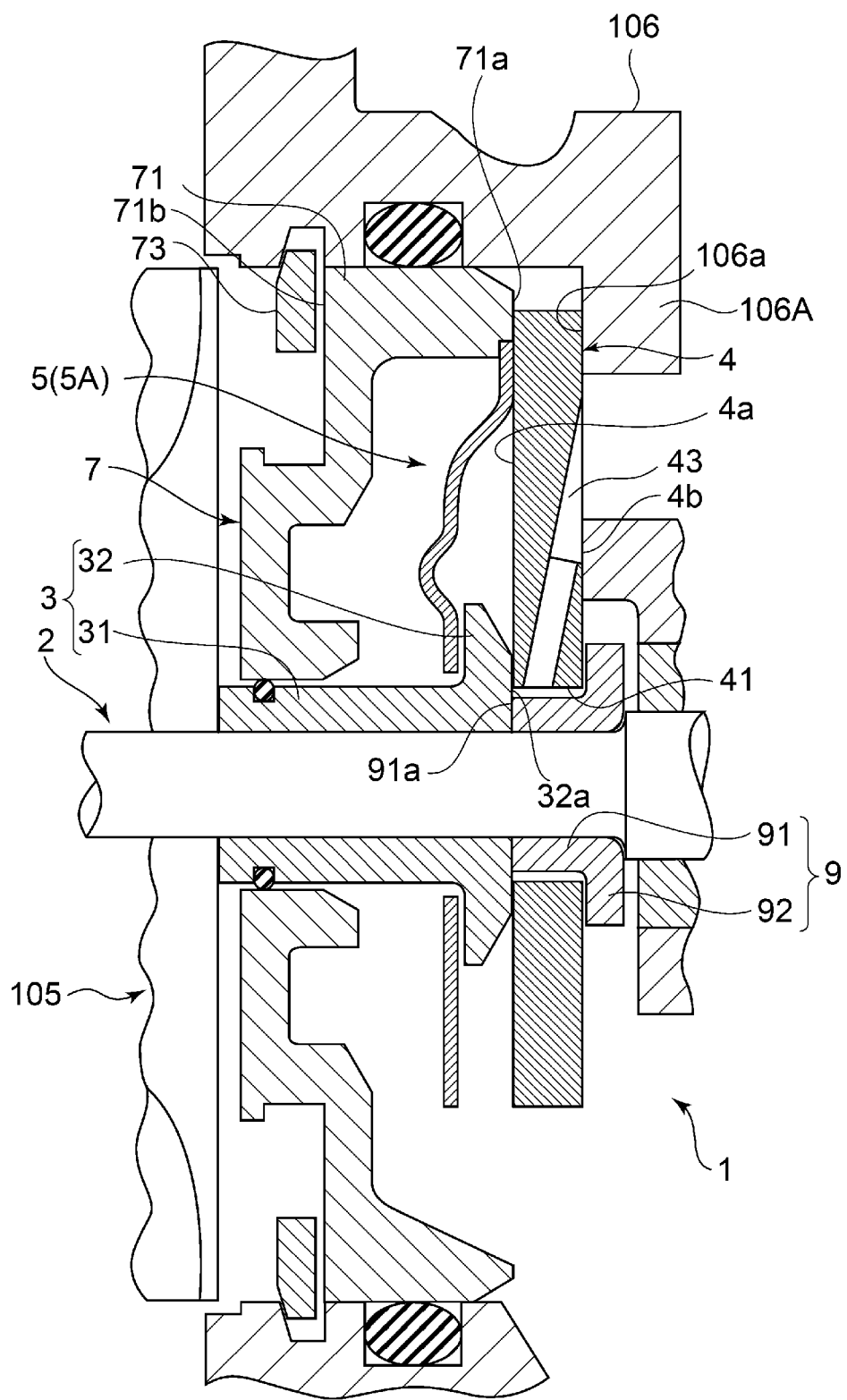
FIG. 2 is an enlarged view of the vicinity of portion "a" in FIG. 1.
Figure 3:
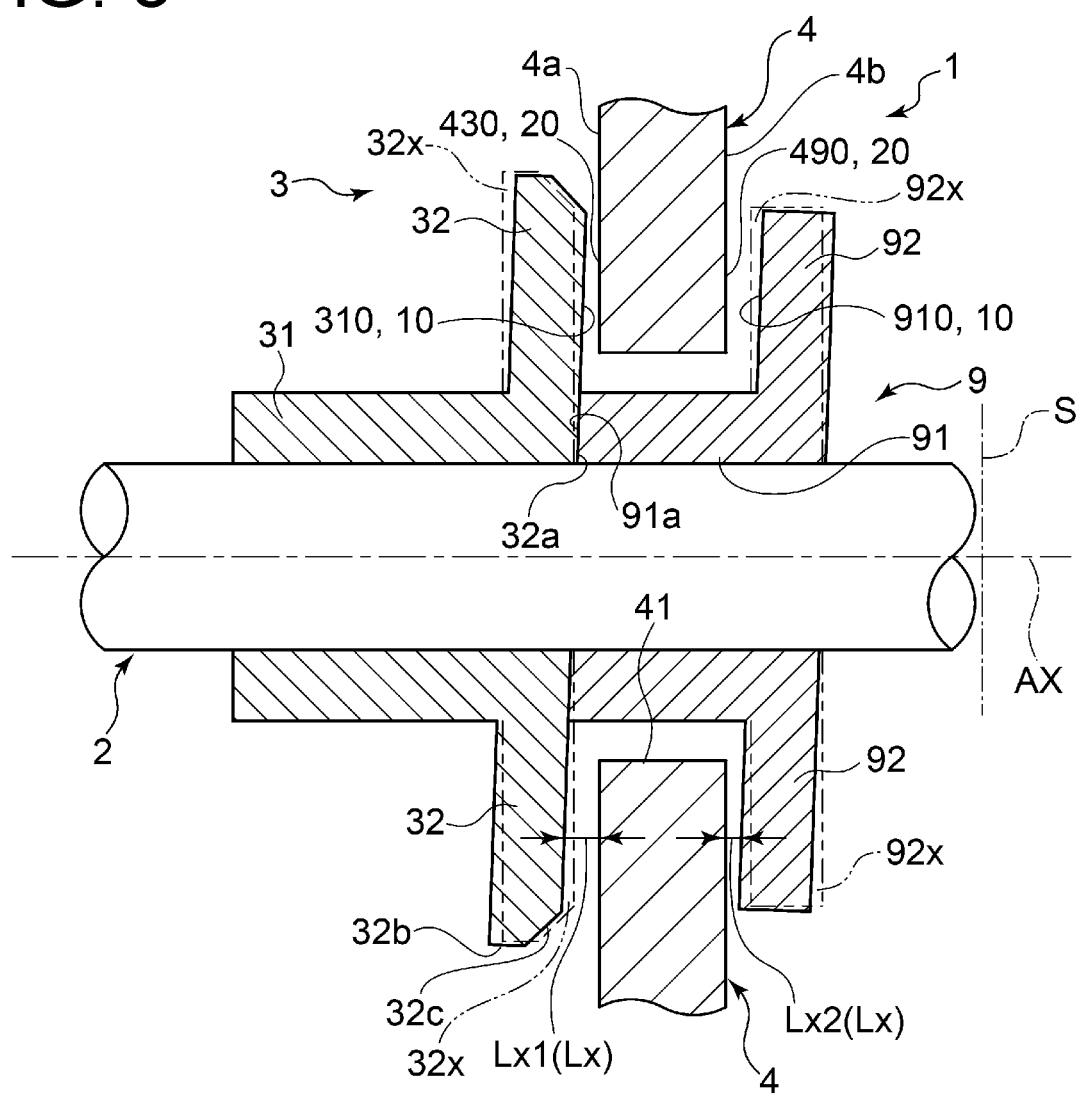
FIG. 3 is a schematic cross-sectional view of a thrust bearing device according to an embodiment.
Figure 4:
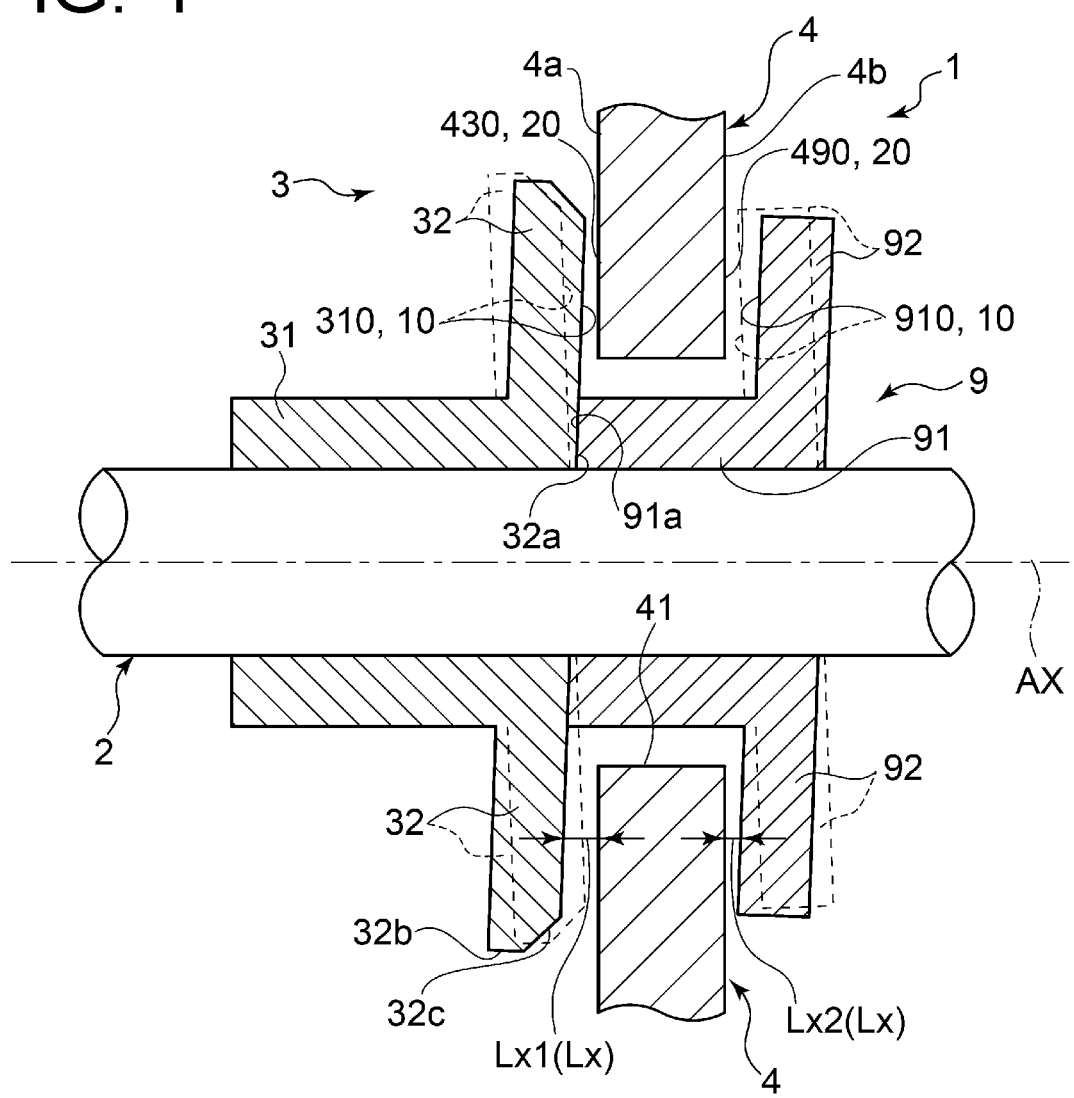
FIG. 4 is a schematic cross-sectional view of a thrust bearing device according to an embodiment when the rotational shaft is rotated.
Figure 5:
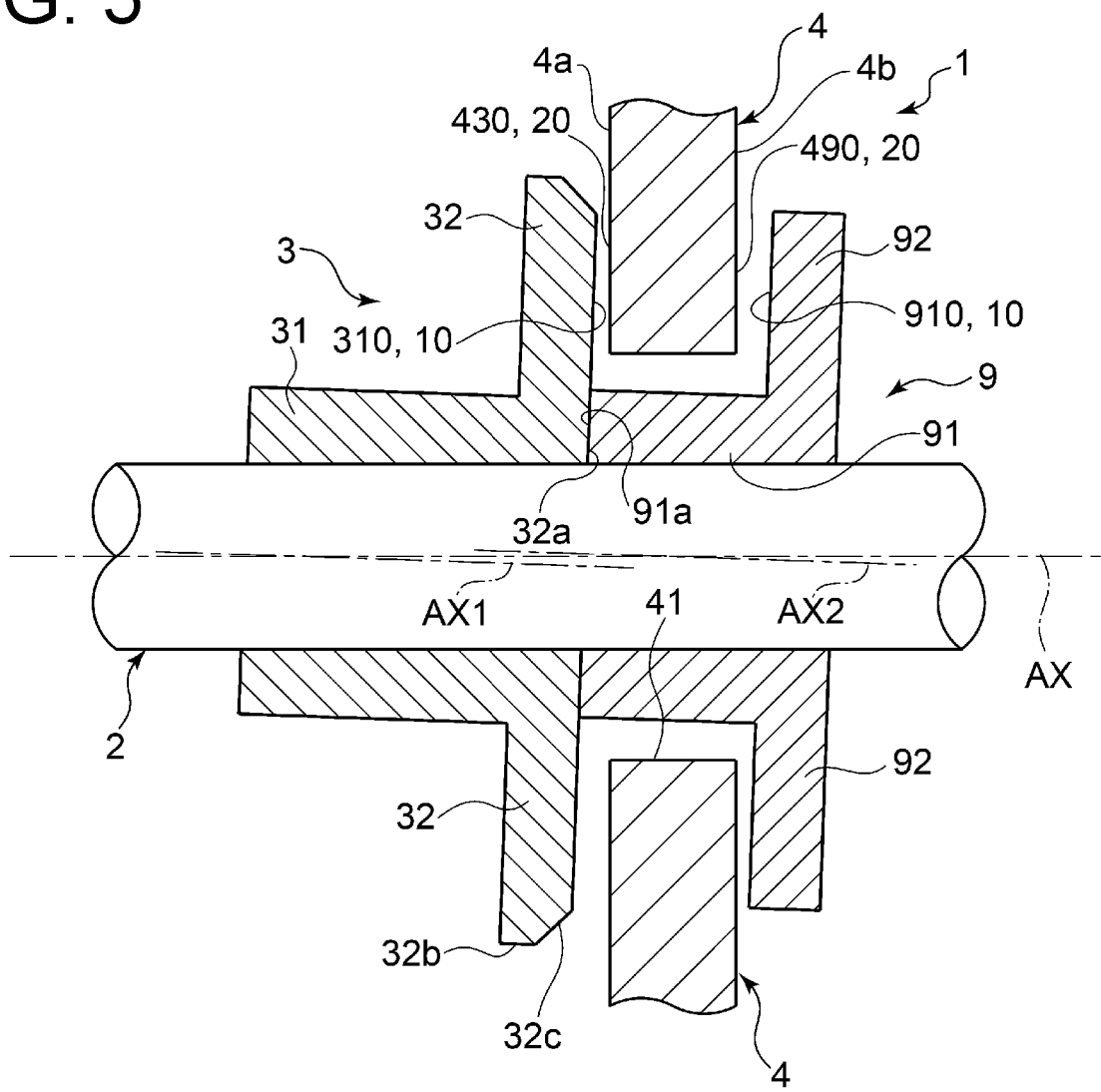
FIG. 5 is a schematic cross-sectional view for a collar member according to another embodiment.
Figure 6:
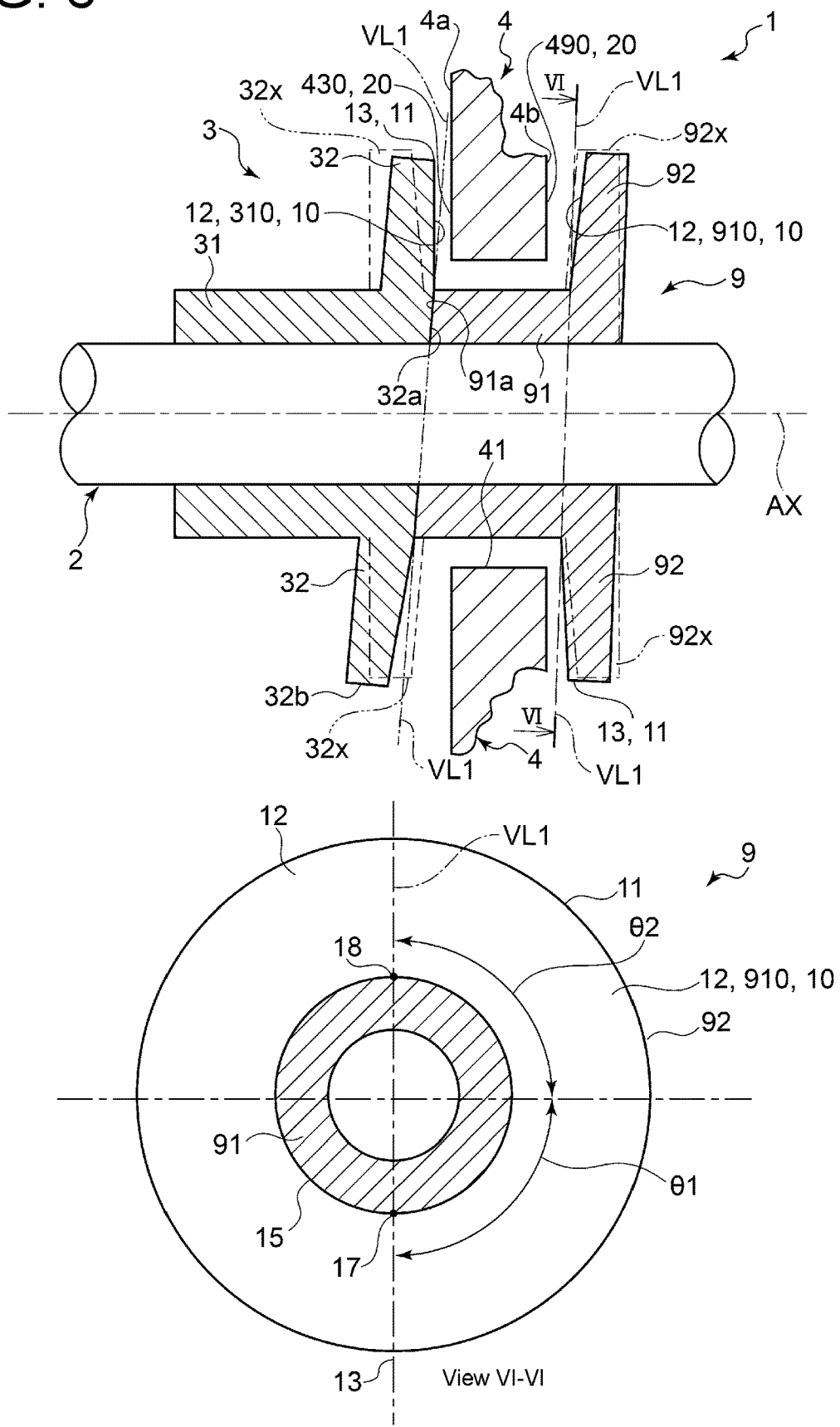
FIG. 6 is a schematic cross-sectional view for a collar member according to still another embodiment.
Figure 7:
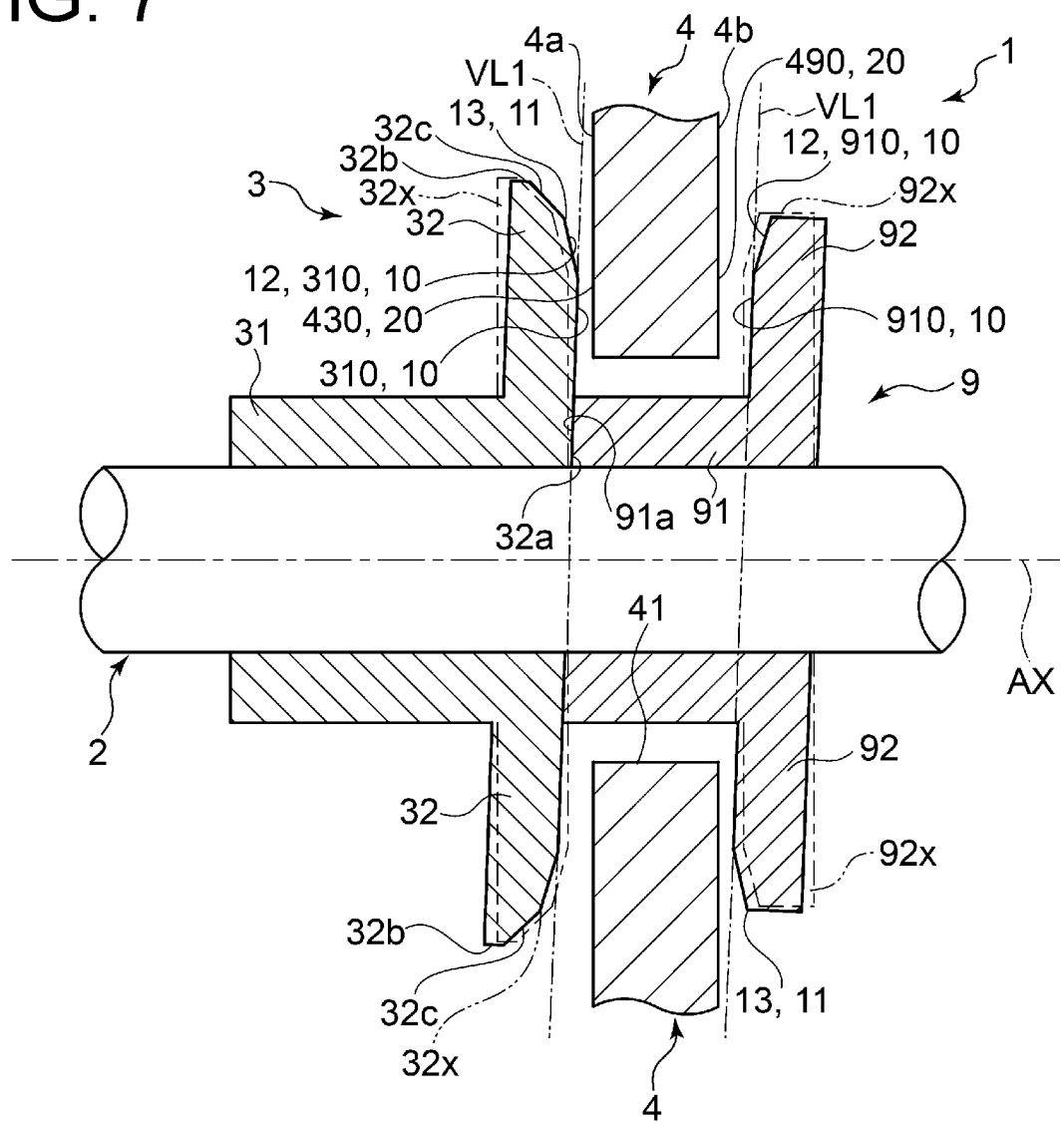
FIG. 7 is a schematic cross-sectional view for a collar member according to still another embodiment.
Figure 8:
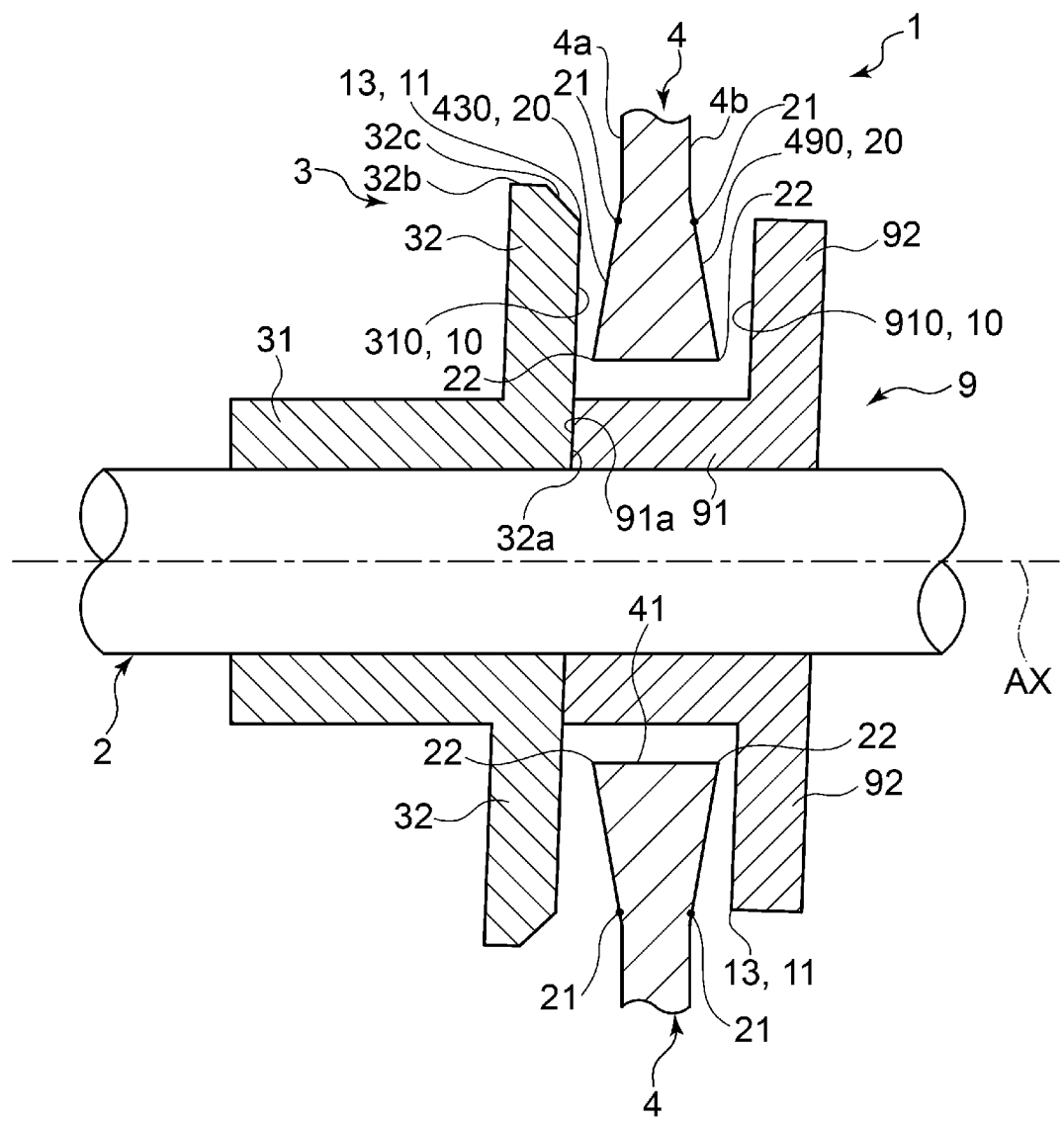
FIG. 8 is a schematic cross-sectional view for a thrust member according to another embodiment.
Figure 9:
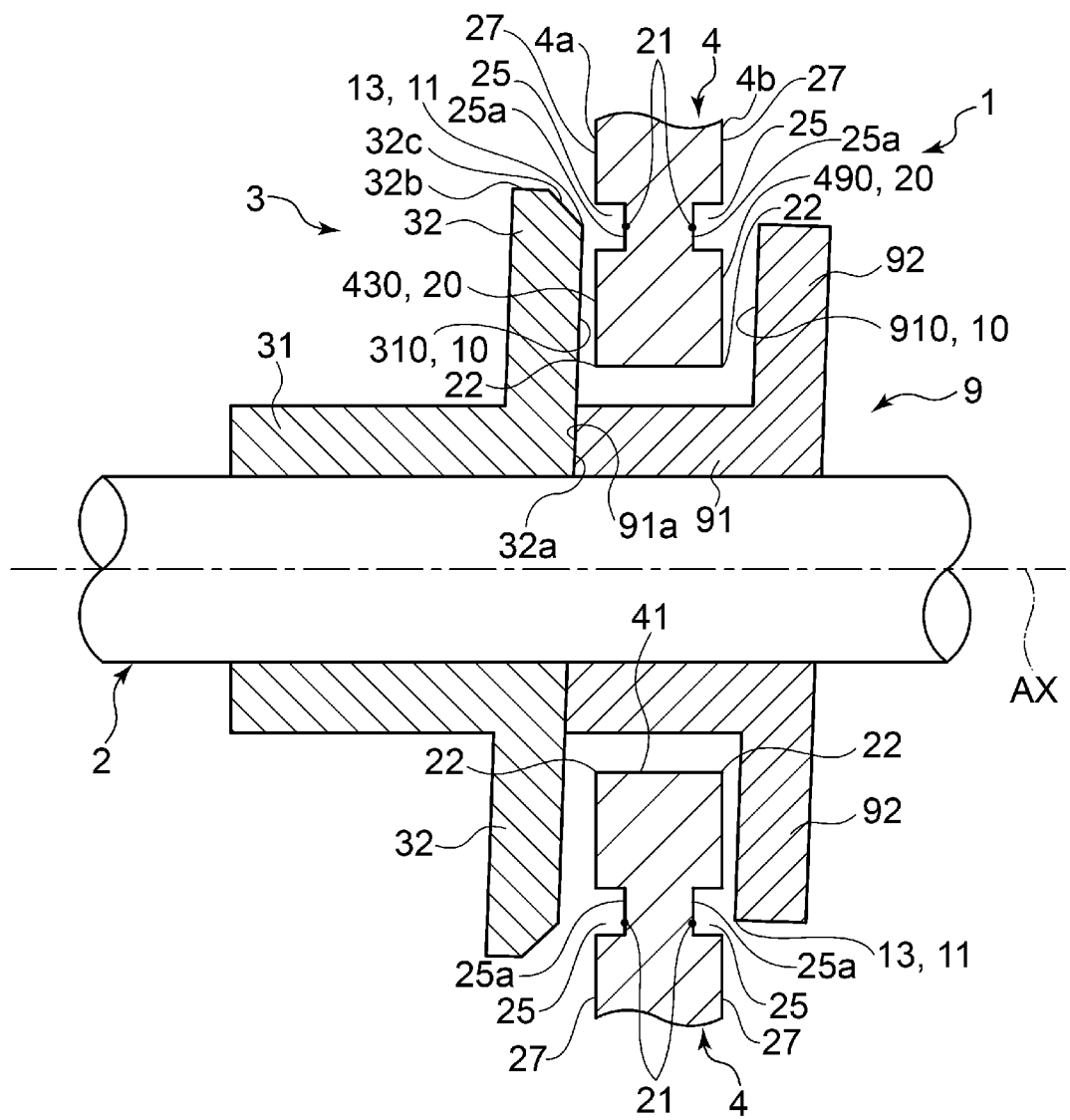
FIG. 9 is a schematic cross-sectional view for a thrust member according to still another embodiment.
Figure 10:
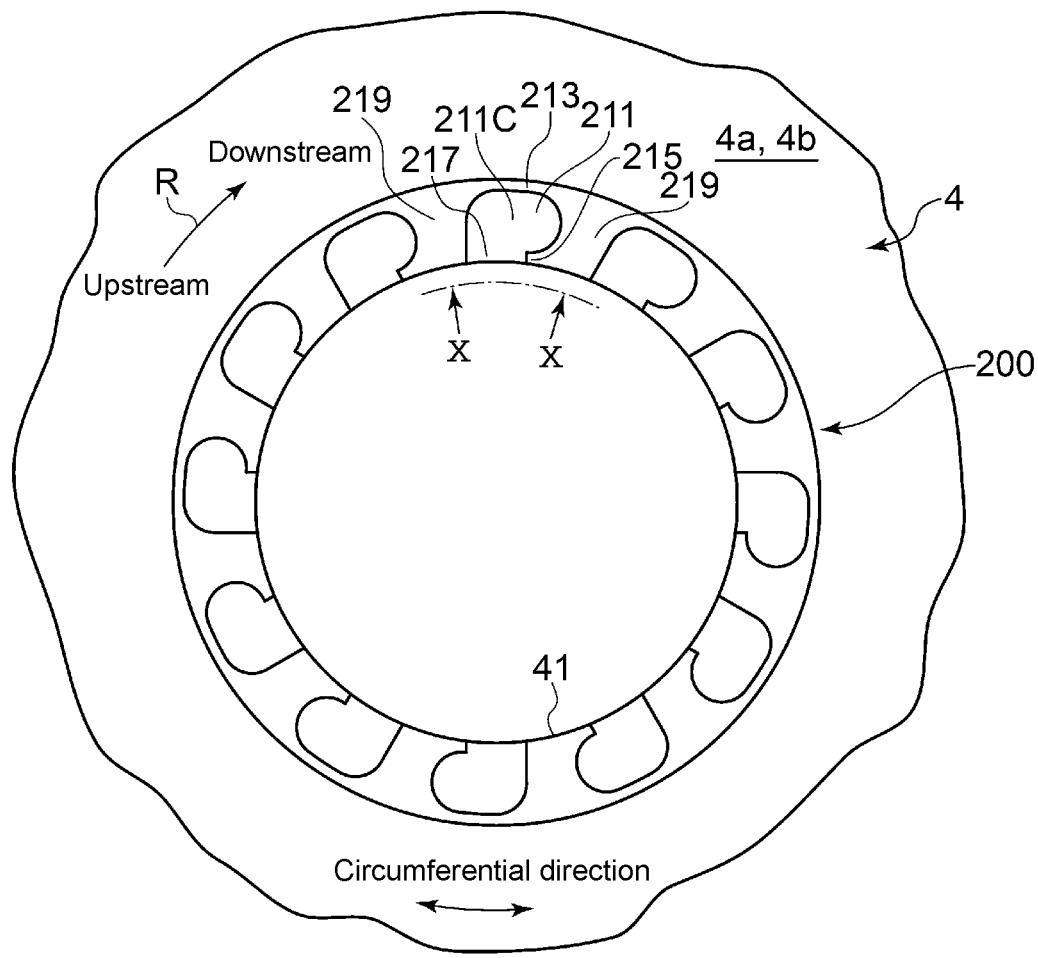
FIG. 10 is a diagram of a pad on a second thrust surface according to an embodiment.
Figure 10:
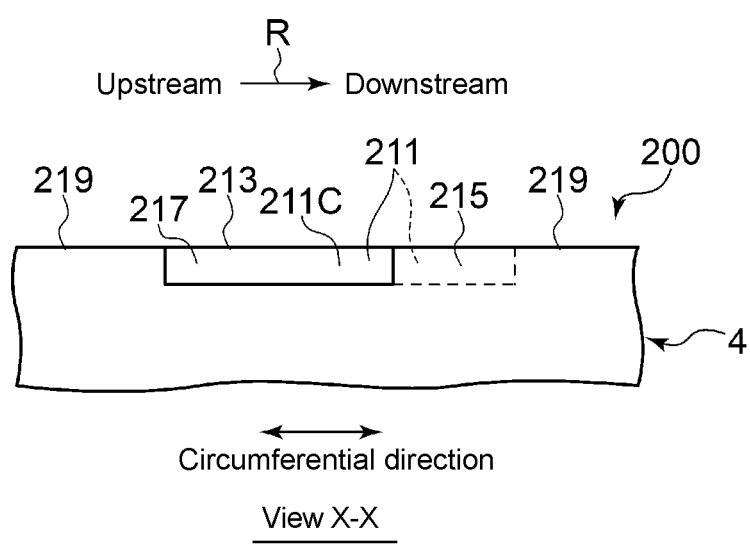
Figure 11:
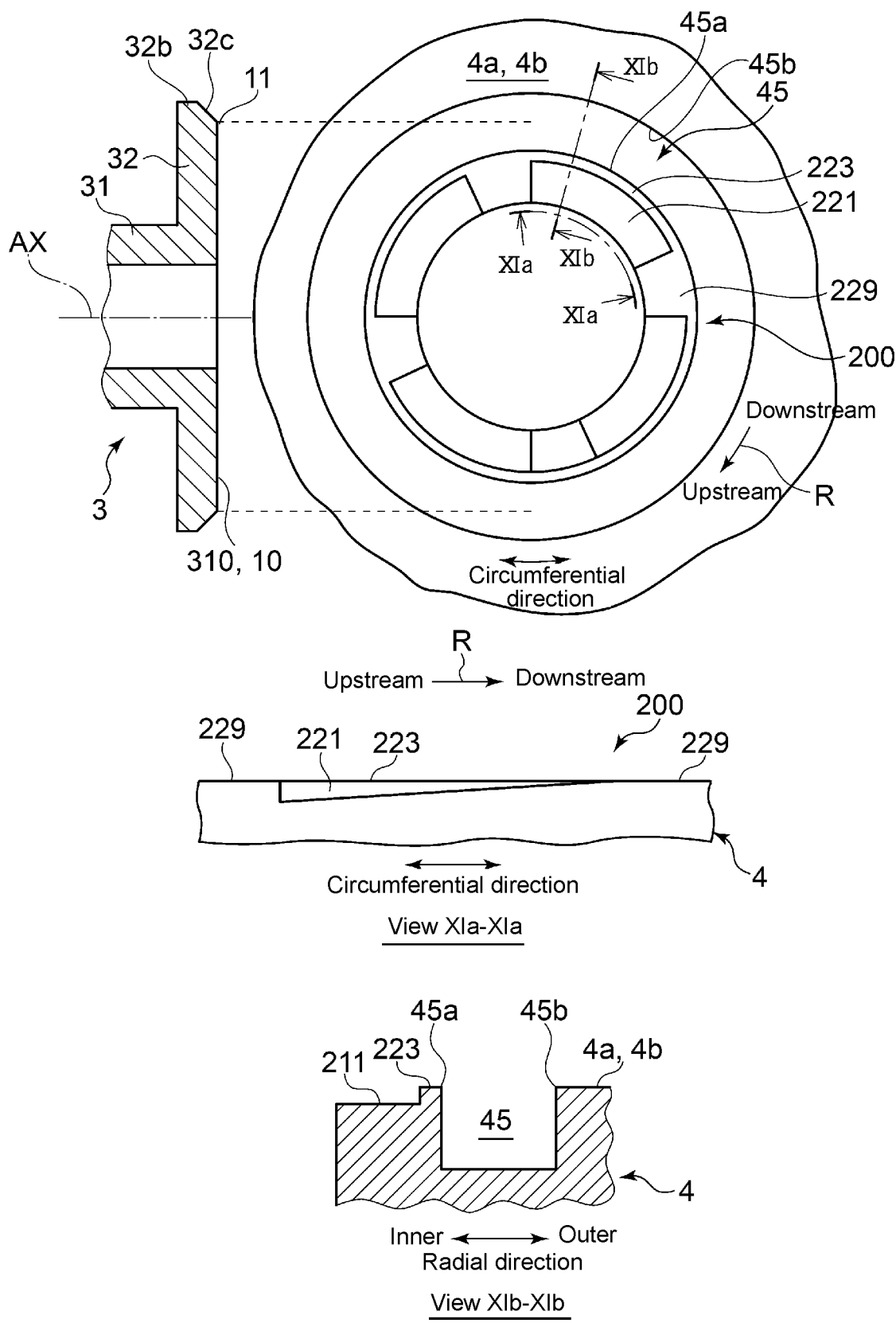
FIG. 11 is a diagram of a pad on a second thrust surface according to another embodiment.

FIG. 2 is an enlarged view of the vicinity of portion "a" in FIG. 1 and is a cross-sectional view of a thrust bearing device according to an embodiment of the present invention. FIG. 3 is a schematic cross-sectional view of a thrust bearing device according to an embodiment. FIG. 4 is a schematic cross-sectional view of a thrust bearing device according to an embodiment when the rotational shaft is rotated. FIG. 5 is a schematic cross-sectional view for a collar member according to another embodiment. FIG. 6 is a schematic cross-sectional view for a collar member according to still another embodiment. FIG. 7 is a schematic cross-sectional view for a collar member according to still another embodiment. FIG. 8 is a schematic cross-sectional view for a thrust member according to another embodiment. FIG. 9 is a schematic cross-sectional view for a thrust member according to still another embodiment. FIG. 10 is a diagram of a pad on a second thrust surface according to an embodiment. FIG. 11 is a diagram of a pad on a second thrust surface according to another embodiment.

As shown in FIGS. 2 to 9, the thrust bearing device 1 according to some embodiments includes a rotational shaft 2, a compressor-side thrust collar 3 and a turbine-side thrust collar 9 as collar members, and a thrust member 4.

In some embodiments, as shown in FIG. 2, the device is provided with an oil deflector 5 and a retainer 7 configured to hold the oil deflector 5 and the thrust member 4 on the outer peripheral side of the rotational shaft 2.

In some embodiments, the retainer 7 is an annular member, and a protruding portion 71 protruding toward the thrust member 4 is formed around the circumference of the retainer 7. A portion of the protruding portion 71 in contact with the thrust member 4 and the oil deflector 5 has a front end surface 71a. The front end surface 71a presses the outer peripheral edge of the oil deflector 5 and the outer peripheral end of the thrust member 4 against one end surface 106a of an inner peripheral projection 106A of the bearing housing 106, so that the thrust member 4 and the oil deflector 5 are held on the outer peripheral side of the rotational shaft 2. Further, a back end surface 71b of the protruding portion 71 is in contact with an annular movement restricting member 73 fitted in an inner peripheral groove of the bearing housing 106. The movement restricting member 73 presses the retainer 7 against the thrust member 4.

(Compressor-Side Thrust Collar 3)

As shown in FIGS. 2 to 9, the compressor-side thrust collar 3 has a cylindrical collar body portion 31 and a flange portion 32 with a diameter larger than that of the collar body portion 31. Further, the compressor-side thrust collar 3 is mounted around the circumference of the rotational shaft 2 so as to be rotatable with the rotational shaft 2.

As shown in FIGS. 3 to 9, a compressor-side first thrust surface 310 is formed on one end surface 32a which is a turbine-side surface of the flange portion 32. Details of the compressor-side first thrust surface 310 will be described later.

(Turbine-Side Thrust Collar 9)

In the illustrated embodiment, the turbine-side thrust collar 9 is mounted around the circumference of the rotational shaft 2 on the turbine side of the compressor-side thrust collar 3. The turbine-side thrust collar 9 has a cylindrical collar body portion 91 and a flange portion 92 with a diameter larger than that of the collar body portion 91. A front end surface 91a of the collar body portion 91 of the turbine-side thrust collar 9 is in contact with one end surface 32a of the flange portion 32 of the compressor-side thrust collar 3.

As shown in FIGS. 3 to 9, a turbine-side first thrust surface 910 is formed on a compressor-side surface of the flange portion 92. Details of the turbine-side first thrust surface 910 will be described later.

(Thrust Member 4)

As shown in FIGS. 2 to 11, the thrust member 4 according to some embodiments is an annular plate member having an insertion hole 41 into which the rotational shaft 2 is inserted. As shown in FIGS. 3 to 11, a compressor-side second thrust surface 430 facing the compressor-side first thrust surface 310 of the compressor-side thrust collar 3 is formed on a compressor-side surface (one end surface 4a) of the thrust member 4 according to some embodiments. When an axial force acts on the rotational shaft 2 from the compressor impeller 105 side to the turbine impeller 103 side, the compressor-side second thrust surface 430 and the compressor-side first thrust surface 310 are in sliding contact with each other to support in the axial direction the rotational shaft 2 which rotates while being inserted in the insertion hole 41.

In the illustrated embodiment, the collar body portion 91 of the turbine-side thrust collar 9 is disposed on the inner peripheral side of the thrust member 4. In other words, the rotational shaft 2 and the collar body portion 91 of the turbine-side thrust collar 9 mounted around the circumference of the rotational shaft 2 are inserted in the insertion hole 41 of the thrust member 4. The outer peripheral end of the thrust member 4 is fixed to the bearing housing 106. In the illustrated embodiment, the inner peripheral surface of the thrust member 4 and the outer peripheral surface of the collar body portion 91 of the turbine-side thrust collar 9 are configured to come into sliding contact with each other when the rotational shaft 2 rotates.

As shown in FIGS. 3 to 11, a turbine-side second thrust surface 490 facing the turbine-side first thrust surface 910 of the turbine-side thrust collar 9 is formed on a turbine-side surface (the other end surface 4b) of the thrust member 4 according to some embodiments. When an axial force acts on the rotational shaft 2 from the turbine impeller 103 side to the compressor impeller 105 side, the turbine-side second thrust surface 490 and the turbine-side first thrust surface 910 are in sliding contact with each other to support in the axial direction the rotational shaft 2 which rotates while being inserted in the insertion hole 41.

Further, an oil supply passage 43 is formed inside the thrust member 4. The oil supply passage 43 has an inlet opening formed on the other end surface 4b of the thrust member 4 and an outlet opening formed on the inner peripheral surface (insertion hole 41) of the thrust member 4. Lubricating oil from the outlet opening is supplied to a space between the inner peripheral surface of the thrust member 4 and the outer peripheral surface of the collar body portion 91 of the turbine-side thrust collar 9, a space between the compressor-side second thrust surface 430 of the thrust member 4 and the compressor-side first thrust surface 310 of the compressor-side thrust collar 3, and a space between the turbine-side second thrust surface 490 of the thrust member 4 and the turbine-side first thrust surface 910 of the turbine-side thrust collar 9.

Hereinafter, unless it is necessary to distinguish between the compressor-side first thrust surface 310 of the compressor-side thrust collar 3 and the turbine-side first thrust surface 910 of the turbine-side thrust collar 9, the compressor-side first thrust surface 310 and the turbine-side first thrust surface 910 may be simply referred to as the first thrust surface 10. Further, hereinafter, when both the compressor-side first thrust surface 310 and the turbine-side first thrust surface 910 are referred to, the compressor-side first thrust surface 310 and the turbine-side first thrust surface 910 may be simply referred to as the first thrust surface 10.

Similarly, hereinafter, unless it is necessary to distinguish between the compressor-side second thrust surface 430 and the turbine-side second thrust surface 490 of the thrust member 4, the compressor-side second thrust surface 430 and the turbine-side second thrust surface 490 may be simply referred to as the second thrust surface 20. Further, hereinafter, when both the compressor-side second thrust surface 430 and the turbine-side second thrust surface 490 are referred to, the compressor-side second thrust surface 430 and the turbine-side second thrust surface 490 may be simply referred to as the second thrust surface 20.

For example, in the thrust bearing device 1 of the turbocharger 100, it is desirable to reduce the area of the sliding contact surface which bears the thrust load, i.e., the areas of the first thrust surface 10 and the second thrust surface 20, in order to suppress mechanical loss in the thrust bearing device 1 and improve the transient response of the turbocharger 100. However, when the areas of the first thrust surface 10 and the second thrust surface 20 are simply reduced, the load capacity of the thrust load is reduced, which may increase the risk of contact and wear.

Features Common to Each Embodiment

In view of the above, in the thrust bearing device 1 according to some embodiments, as shown in FIGS. 3 to 9, the first thrust surface 10 is configured to be inclined with respect to a plane (perpendicular plane) S (see FIG. 3) perpendicular to the axis AX of the rotational shaft 2 so that a distance Lx (see FIG. 3) between the first thrust surface 10 and the second thrust surface 20 periodically increases and decreases with rotation of the rotational shaft 2.

Specifically, as shown in FIGS. 3 to 9, in the thrust bearing device 1 according to some embodiments, the compressor-side first thrust surface 310 is configured to be inclined with respect to the perpendicular plane S perpendicular to the axis AX of the rotational shaft 2 so that a distance Lx1 (see FIG. 3) between the compressor-side first thrust surface 310 and the compressor-side second thrust surface 430 periodically increases and decreases with rotation of the rotational shaft 2.

Similarly, as shown in FIGS. 3 to 9, in the thrust bearing device 1 according to some embodiments, the turbine-side first thrust surface 910 is configured to be inclined with respect to the perpendicular plane S perpendicular to the axis AX of the rotational shaft 2 so that a distance Lx2 (see FIG. 3) between the turbine-side first thrust surface 910 and the turbine-side second thrust surface 490 periodically increases and decreases with rotation of the rotational shaft 2.

In the thrust bearing device 1 according to some embodiments shown in FIGS. 3 to 9, the entire flange portion 32 of the compressor-side thrust collar 3 and the entire flange portion 92 of the turbine-side thrust collar 9 are inclined with respect to the perpendicular plane S. However, in the thrust bearing device 1 according to some embodiments, the entire flange portion 32 of the compressor-side thrust collar 3 and the entire flange portion 92 of the turbine-side thrust collar 9 may not be inclined with respect to the perpendicular plane S as long as the first thrust surface 10 is inclined with respect to the perpendicular plane S.

As shown in FIGS. 3 to 9, with the thrust bearing device 1 according to some embodiments, since the distance Lx between the first thrust surface 10 and the second thrust surface 20 periodically increases and decreases with rotation of the rotational shaft 2, a squeeze effect occurs between the first thrust surface 10 and the second thrust surface 20, which improves the load capacity of the thrust load. Thus, the reduction in load capacity of the thrust load can be suppressed even while reducing the area of the sliding contact surface which bears the thrust load, i.e., the areas of the first thrust surface 10 and the second thrust surface 20. Therefore, as shown in FIGS. 3 to 9, with the thrust bearing device 1 according to some embodiments, it is possible to suppress both the mechanical loss due to the reduced areas of the first thrust surface 10 and the second thrust surface 20 and the reduction in load capacity of the thrust load.

In FIG. 3, the flange portion 32x of the compressor-side thrust collar 3 and the flange portion 92x of the turbine-side thrust collar 9 when the first thrust surface 10 is not oblique to the perpendicular plane S, that is, is parallel to the perpendicular plane S are shown by the long dashed double-short dashed lines.

Further, FIG. 4 schematically shows how the distance Lx between the first thrust surface 10 and the second thrust surface 20 periodically increases and decreases with rotation of the rotational shaft 2 in the thrust bearing device 1 shown in FIG. 3, using the solid and dashed lines. In FIG. 4, the flange portion 32 of the compressor-side thrust collar 3 and the flange portion 92 of the turbine-side thrust collar 9 when the compressor-side thrust collar 3 and the turbine-side thrust collar 9 shown by the solid lines are rotated 180 degrees around the axis AX are shown by the dashed lines.

As shown in FIGS. 3, 4 and 6 to 9, in the thrust bearing device 1 according to some embodiments, the collar body portion 31 of the compressor-side thrust collar 3 and the collar body portion 91 of the turbine-side thrust collar 9 extend parallel to the axis AX of the rotational shaft 2. In other words, as shown in FIGS. 3, 4 and 6 to 9, in the thrust bearing device 1 according to some embodiments, the axis AX1 of the collar body portion 31 of the compressor-side thrust collar 3 and the axis AX2 of the collar body portion 91 of the turbine-side thrust collar 9 are parallel to the axis AX of the rotational shaft 2. Further, as described above, the first thrust surface 10 is inclined with respect to the perpendicular plane S.

However, in some embodiments shown in FIGS. 3, 4 and 6 to 9, for example as in the embodiment shown in FIG. 5, the compressor-side first thrust surface 310 may be inclined with respect to the perpendicular plane S by making the axis AX1 of the collar body portion 31 of the compressor-side thrust collar 3 oblique to the axis AX of the rotational shaft 2. Similarly, in some embodiments shown in FIGS. 3, 4 and 6 to 9, for example as in the embodiment shown in FIG. 5, the turbine-side first thrust surface 910 may be inclined with respect to the perpendicular plane S by making the axis AX2 of the collar body portion 91 of the turbine-side thrust collar 9 oblique to the axis AX of the rotational shaft 2.

In the embodiment shown in FIG. 5, the compressor-side first thrust surface 310 may extend parallel to the radial direction about the axis AX1 of the collar body portion 31 of the compressor-side thrust collar 3, and the turbine-side first thrust surface 910 may extend parallel to the radial direction about the axis AX2 of the collar body portion 91 of the turbine-side thrust collar 9.

That is, in some embodiments shown in FIGS. 3, 4 and 6 to 9, for example as in the embodiment shown in FIG. 5, the compressor-side first thrust surface 310 may be inclined with respect to the perpendicular plane S by forming the through hole for receiving the rotational shaft 2 obliquely to the axis AX1 of the collar body portion 31 of the compressor-side thrust collar 3. Similarly, in some embodiments shown in FIGS. 3, 4 and 6 to 9, for example as in the embodiment shown in FIG. 5, the turbine-side first thrust surface 910 may be inclined with respect to the perpendicular plane S by forming the through hole for receiving the rotational shaft 2 obliquely to the axis AX2 of the collar body portion 91 of the turbine-side thrust collar 9.

In the thrust bearing device 1 according to some embodiments shown in FIGS. 2 to 9, as in the embodiments shown in FIGS. 3 to 5 and 7 to 9, the flange portion 32 of the compressor-side thrust collar 3 may have a C-chamfered or R-chamfered inclined portion 32c between the end surface 32a and the outer peripheral surface 32b of the flange portion 32. The inclined portion 32c does not bear the thrust load. Similarly, although not shown, the flange portion 92 of the turbine-side thrust collar 9 may have an inclined portion similar to the inclined portion 32c between the surface facing the other end surface 4b of the thrust member 4, i.e., the surface opposite to the turbine-side first thrust surface 910 and the outer peripheral surface of the flange portion 92.

In the present disclosure, the inclined portion 32c and the inclined portion (not shown) of the flange portion 92 are not included in the first thrust surface 10 because they do not contribute to bearing the thrust load.

Embodiments Shown in FIGS. 6 and 7

For convenience of explanation in the embodiments shown in FIGS. 6 and 7, a first angular position, a second angular position, and a first virtual line are defined as follows.

As shown in FIG. 6, with respect to angular position about the axis AX of the rotational shaft 2, an angular position where a first outer peripheral position 13, which is a position of the outer peripheral edge 11 of the first thrust surface 10 having the smallest distance Lx from the second thrust surface 20, exists is defined as a first angular position $\theta 1$.

An angular position 180 degrees different from the first angular position $\theta 1$ is defined as a second angular position $\theta 2$.

A virtual line passing through a first inner peripheral position 17, which is the inner peripheral edge 15 of the first thrust surface 10 in the first angular position $\theta 1$, and a second inner peripheral position 18, which is the inner peripheral edge 15 of the first thrust surface 10 in the second angular position $\theta 2$, is defined as a first virtual line VL1.

In the embodiments shown in FIGS. 6 and 7, in a cross-section including the first virtual line VL1 and the axis AX of the rotational shaft 2, i.e., in the cross-section including the axis AX shown in FIG. 6 and the cross-section shown in FIG. 7, the first thrust surface 10 is configured such that the first outer peripheral position 13 is disposed on the opposite side of the first virtual line VL1 from the second thrust surface 20.

Accordingly, in the embodiments shown in FIGS. 6 and 7, since the first outer peripheral position 13 is farther from the second thrust surface 20 than the first virtual line VL1, the first thrust surface 10 is less likely to come into contact with the second thrust surface 20 in the vicinity of the first outer peripheral position 13. Thus, it is possible to improve the reliability and durability of the thrust bearing device 1.

In the embodiments shown in FIGS. 6 and 7, the first thrust surface 10 includes a conical surface 12 formed so as to slide on the second thrust surface 20.

In the embodiments shown in FIGS. 6 and 7, the conical surface 12 is formed so that the top side of the cone faces the thrust member 4. In the embodiments shown in FIGS. 6 and 7, the outer peripheral edge 11 of the first thrust surface 10 is farther away from the second thrust surface 20 than when the first thrust surface 10 is flat. Thus, the first thrust surface 10 is less likely to come into contact with the second thrust surface 20 in the vicinity of the outer peripheral edge 11, so that it is possible to improve the reliability and durability of the thrust bearing device 1.

The conical surface 12 may be formed from the inner peripheral edge 15 to the outer peripheral edge 11 of the first thrust surface 10 as in the embodiment shown in FIG. 6, or may be formed in a partial region around the outer peripheral edge 11 of the first thrust surface 10 as in the embodiment shown in FIG. 7.

Embodiments Shown in FIGS. 8 and 9

For convenience of explanation in the embodiments shown in FIGS. 8 and 9, a first radial position and a second radial position are defined as follows.

As shown in FIGS. 8 and 9, a radial position of the second thrust surface 20 facing the outer peripheral edge 11 of the first thrust surface 10 is defined as a first radial position 21. The first radial position 21 exists over the entire circumference of the second thrust surface 20 along the circumferential direction.

Further, the innermost radial position of the second thrust surface is defined as a second radial position 22.

In the embodiments shown in FIGS. 8 and 9, the second thrust surface 20 is farther from the first thrust surface 10 in the first radial position 21 than in the second radial position 22.

Specifically, for example, in the embodiment shown in FIG. 8, the second thrust surface 20 is inclined such that a distance from the first thrust surface 10 increases from the second radial position 22 toward the radially outer side. Further, for example, in the embodiment shown in FIG. 9, an annular recess 25 is formed on the second thrust surface 20 in the first radial position 21. Accordingly, in the embodiment shown in FIG. 9, since the first radial position 21 is the same as the radial position of the bottom surface 25a of the recess 25, the first radial position 21 is farther from the first thrust surface 10 than the second radial position 22.

Accordingly, in the embodiments shown in FIGS. 8 and 9, since the second thrust surface 20 is farther from the first thrust surface 10 in the first radial position 21 than in the second radial position 22, the first thrust surface 10 is less likely to come into contact with the second thrust surface 20 in the vicinity of the first radial position 21. Thus, it is possible to improve the reliability and durability of the thrust bearing device 1.

In the embodiment shown in FIG. 9, the second thrust surface 20 is closer to the first thrust surface 10 in at least a part of a region 27 disposed radially outward of the first radial position 21 than in the first radial position 21.

Specifically, in the embodiment shown in FIG. 9, at least a part of the region radially outward of the annular recess 25 is closer to the first thrust surface 10 than the bottom surface 25a of the recess 25.

Accordingly, in the embodiment shown in FIG. 9, the dimension of the thrust member 4 along the axial direction in at least a part of the region 27 radially outward of the first radial position 21 is larger than the dimension of the thrust member 4 along the axial direction in the first radial position 21. For example, in the case where the thrust member 4 is a plate member extending along the radial direction as in the illustrated embodiments, the strength of the thrust member 4 can be improved by increasing the thickness of the thrust member 4 in at least a part of the region 27 radially outward of the first radial position 21 as with the thrust member 4 according to the embodiment shown in FIG. 9.

Embodiment of Pad 200

An embodiment of a pad 200 on the second thrust surface 20 will be described with reference to FIG. 10. FIG. 10 shows the thrust member 4 viewed from the axial direction.

In some embodiments shown in FIGS. 2 to 9, the thrust member 4 may have a pad 200 shown in FIG. 10. The pad 200 shown in FIG. 10 is formed on the second thrust surface 20.

The pad 200 shown in FIG. 10 is provided with a plurality of recesses 211, a plurality of outer weir portions 213 formed on the radially outer side in the recesses 211, and a plurality of inner weir portions 215 formed on the radially inner side in the recesses 211, which are arranged on the second thrust surface 20 in the circumferential direction.

In the pad 200 shown in FIG. 10, each of the recesses 211 communicates with the insertion hole 41 via a connecting hole 217. Each connecting hole 217 is offset from the center position 211C of the recess 211 in the circumferential direction of the rotational shaft 2 to the upstream side in the rotational direction of the rotational shaft 2. In FIG. 10, the rotational direction of the rotational shaft 2 is indicated by the arrow R.

In the pad 200 shown in FIG. 10, a land portion 219 is formed between two recesses 211 adjacent to each other in the circumferential direction.

In the pad 200 shown in FIG. 10, since the recesses 211 are arranged in the circumferential direction, when the first thrust surface 10 configured to be inclined with respect to the perpendicular plane S rotates about the axis AX, the squeeze effect can be obtained more effectively. Further, the pad 200 shown in FIG. 10 is easy to process since the recesses 211 can be easily formed by an end mill or the like.

In the pad 200 shown in FIG. 10, lubricating oil flows from the insertion hole 41 into each of the recesses 211 through each of the connecting holes 217. This lubricating oil has a downstream velocity component in the rotational direction due to the influence of the rotation of the rotational shaft 2. Further, since each connecting hole 217 is offset from the center position 211C of the recess 211 in the circumferential direction of the rotational shaft 2 to the upstream side in the rotational direction of the rotational shaft 2, the lubricating oil can easily enter the recess 211. As a result, the lubricating oil entering the recess 211 easily flows from the recess 211 into a gap between the first thrust surface 10 and the second thrust surface 20 (a gap between the first thrust surface 10 and the land portion 219). It is thus easy to ensure the load capacity of the thrust bearing device 1.

Another Embodiment of Pad 200

Another embodiment of a pad 200 on the second thrust surface 20 will be described with reference to FIG. 11. FIG. 11 shows the thrust member 4 viewed from the axial direction. In FIG. 11, for convenience of explanation of an annular groove 45 described later, a cross-sectional view of the compressor-side thrust collar 3 along the axis AX is also shown in order to compare the dimensions with each portion of the compressor-side thrust collar 3. In the compressor-side thrust collar 3 shown in FIG. 11, for convenience of explanation, the compressor-side first thrust surface 310 is not inclined with respect to the perpendicular plane S.

In some embodiments shown in FIGS. 2 to 9, the thrust member 4 may have a pad 200 shown in FIG. 11. The pad 200 shown in FIG. 11 is formed on the second thrust surface 20.

The pad 200 shown in FIG. 11 is a pad 200 provided with a plurality of tapered portions 221 and a plurality of land portions 229 arranged in the circumferential direction on the second thrust surface 20, which is a so-called tapered land thrust bearing pad 200. In the pad 200 shown in FIG. 11, an outer weir portion 223 is formed on the radially outer side in each tapered portion 221.

(Annular Groove 45)

In some embodiments shown in FIGS. 2 to 9, the thrust member 4 may have an annular groove 45 shown in FIG. 11 in a region radially outward of the pad 200 shown in FIGS. 10 and 11. The annular groove 45 shown in FIG. 11 may be provided on either one end surface 4a or the other end surface 4b. That is, in some embodiments shown in FIGS. 2 to 9, the thrust member 4 may have an annular groove 45 extending in the circumferential direction on the second thrust surface 20. The diameter of the inner peripheral edge 45a of the annular groove 45 is smaller than the diameter of the outer peripheral edge 11 of the first thrust surface 10, and the diameter of the outer peripheral edge 45b of the annular groove 45 is larger than the diameter of the outer peripheral edge 11 of the first thrust surface 10.

With the annular groove 45 shown in FIG. 11, the squeeze effect can be obtained more effectively by the lubricating oil accumulated in the annular groove 45 while suppressing the contact between the region in the vicinity of the outer peripheral edge 11 of the first thrust surface 10 and the second thrust surface 20 by the annular groove 45.

A turbocharger 100 according to at least one embodiment of the present disclosure includes the turbine impeller 103 attached to one end of the rotational shaft 2, the compressor impeller 105 attached to the other end of the rotational shaft 2, and the thrust bearing device 1 according to any one of the above-described embodiments.

Thus, excellent transient response of the turbocharger 100 can be achieved while ensuring the durability of the turbocharger 100.

The present disclosure is not limited to the embodiments described above, but includes modifications to the embodiments described above, and embodiments composed of combinations of those embodiments.

For example, as described above, the first thrust surface 10 configured to be inclined with respect to the perpendicular plane S may be provided on only one of the compressor-side thrust collar 3 or the turbine-side thrust collar 9.

In the above-described embodiments, the thrust bearing device 1 is a bearing device for supporting the thrust force of the rotational shaft 2 in the turbocharger 100, but may be a bearing device for supporting a thrust force of a rotational shaft in a rotating device other than the turbocharger 100. In this case, the lubricating fluid may be a liquid other than lubricating oil, or may be a gas.

The contents described in the above embodiments would be understood as follows, for instance.

(1) A thrust bearing device 1 according to at least one embodiment of the present disclosure includes: a rotational shaft 2; a compressor-side thrust collar 3 and a turbine-side thrust collar 9 as a collar member fitted to the rotational shaft 2 and having a first thrust surface 10; and a thrust member 4 having an insertion hole 41 into which the rotational shaft 2 is inserted and a second thrust surface 20 which is disposed around the insertion hole 41 and faces the first thrust surface 10 of the collar member. The first thrust surface 10 is configured to be inclined with respect to a perpendicular plane S perpendicular to the axis AX of the rotational shaft 2 so that a distance Lx between the first thrust surface 10 and the second thrust surface 20 periodically increases and decreases with rotation of the rotational shaft 2.

According to the above configuration (1), since the distance Lx between the first thrust surface 10 and the second thrust surface 20 periodically increases and decreases with rotation of the rotational shaft 2, a squeeze effect occurs between the first thrust surface 10 and the second thrust surface 20, which improves the load capacity of the thrust load. Thus, the reduction in load capacity of the thrust load can be suppressed even while reducing the area of the sliding contact surface which bears the thrust load, i.e., the areas of the first thrust surface 10 and the second thrust surface 20. Therefore, with the above configuration (1), it is possible to suppress both the mechanical loss due to the reduced areas of the first thrust surface 10 and the second thrust surface 20 and the reduction in load capacity of the thrust load.

As described above, an angular position where a first outer peripheral position 13, which is a position of the outer peripheral edge 11 of the first thrust surface 10 having the smallest distance Lx from the second thrust surface 20, exists is defined as a first angular position θ1.

Further, a virtual line passing through a first inner peripheral position 17, which is the inner peripheral edge 15 of the first thrust surface 10 in the first angular position θ1, and a second inner peripheral position 18, which is the inner peripheral edge 15 of the first thrust surface 10 in a second angular position θ2 180 degrees different from the first angular position θ1, is defined as a first virtual line VL1.

(2) In some embodiments, in the above configuration (1), in a cross-section including the first virtual line VL1 and the axis AX of the rotational shaft 2, the first thrust surface 10 is configured such that the first outer peripheral position 13 is disposed on the opposite side of the first virtual line VL1 from the second thrust surface 20.

According to the above configuration (2), since the first outer peripheral position 13 is farther from the second thrust surface 20 than the first virtual line VL1, the first thrust surface 10 is less likely to come into contact with the second thrust surface 20 in the vicinity of the first outer peripheral position 13. Thus, it is possible to improve the reliability and durability of the thrust bearing device 1.

(3) In some embodiments, in the above configuration (2), the first thrust surface 10 includes a conical surface 12 formed so as to slide on the second thrust surface 20.

According to the above configuration (3), if the conical surface 12 is formed such that the top side of the cone faces the thrust member 4, the outer peripheral edge 11 of the first thrust surface 10 is farther away from the second thrust surface 20 than when the first thrust surface 10 is flat. Thus, the first thrust surface 10 is less likely to come into contact with the second thrust surface 20 in the vicinity of the outer peripheral edge 11, so that it is possible to improve the reliability and durability of the thrust bearing device 1.

A radial position of the second thrust surface 20 facing the outer peripheral edge 11 of the first thrust surface 10 is defined as a first radial position 21.

Further, the innermost radial position of the second thrust surface 20 is defined as a second radial position 22.

(4) In some embodiments, in any one of the above configurations (1) to (3), the second thrust surface 20 is farther from the first thrust surface 10 in the first radial position 21 than in the second radial position 22.

According to the above configuration (4), since the second thrust surface 20 is farther from the first thrust surface 10 in the first radial position 21, which faces the outer peripheral edge 11 of the first thrust surface 10, than in the second radial position 22, the first thrust surface 10 is less likely to come into contact with the second thrust surface 20 in the vicinity of the first radial position 21. Thus, it is possible to improve the reliability and durability of the thrust bearing device 1.

(5) In some embodiments, in the above configuration (4), the second thrust surface 20 is closer to the first thrust surface 10 in at least a part of a region 27 disposed radially outward of the first radial position 21 than in the first radial position 21.

According to the above configuration (5), the dimension of the thrust member 4 along the axial direction in at least a part of the region 27 radially outward of the first radial position 21 is larger than the dimension of the thrust member 4 along the axial direction in the first radial position 21. For example, in the case where the thrust member 4 is a plate member extending along the radial direction, with the above configuration (5), the strength of the thrust member 4 can be improved by increasing the thickness of the thrust member 4 in at least a part of the region 27 radially outward of the first radial position 21.

(6) In some embodiments, in any one of the above configurations (1) to (5), the thrust member 4 is provided with a plurality of recesses 211, a plurality of outer weir portions 213 formed on the radially outer side in the recesses 211, and a plurality of inner weir portions 215 formed on the radially inner side in the recesses 211, which are arranged on the second thrust surface 20 in the circumferential direction.

According to the above configuration (6), since the recesses 211 are arranged in the circumferential direction, when the first thrust surface 10 configured to be inclined with respect to the perpendicular plane S rotates about the axis AX, the squeeze effect can be obtained more effectively. Further, with the above configuration (6), since the recesses 211 can be easily formed by an end mill or the like, it is easy to process.

(7) In some embodiments, in the above configuration (6), each of the recesses 211 communicates with the insertion hole 41 via a connecting hole 217. Each connecting hole 217 is offset from the center position 211C of the recess 211 in the circumferential direction of the rotational shaft 2 to the upstream side in the rotational direction of the rotational shaft 2.

According to the above configuration (7), fluid flows from the insertion hole 41 into each of the recesses 211 through each of the connecting holes 217. This fluid has a downstream velocity component in the rotational direction due to the influence of the rotation of the rotational shaft 2. Further, since each connecting hole 217 is offset from the center position 211C of the recess 211 in the circumferential direction of the rotational shaft 2 to the upstream side in the rotational direction of the rotational shaft 2, the fluid can easily enter the recess 211. As a result, the fluid entering the recess 211 easily flows from the recess 211 into a gap between the first thrust surface 10 and the second thrust surface 20. It is thus easy to ensure the load capacity of the thrust bearing device 1.

(8) In some embodiments, in any one of the above configurations (1) to (7), the thrust member 4 has an annular groove 45 extending in the circumferential direction on the second thrust surface 20. The diameter of the inner peripheral edge 45a of the annular groove 45 is smaller than the diameter of the outer peripheral edge 11 of the first thrust surface 10, and the diameter of the outer peripheral edge 45b of the annular groove 45 is larger than the diameter of the outer peripheral edge 11 of the first thrust surface 10.

According to the above configuration (8), the squeeze effect can be obtained more effectively by the fluid accumulated in the annular groove 45 while suppressing the contact between the region in the vicinity of the outer peripheral edge 11 of the first thrust surface 10 and the second thrust surface 20 by the annular groove 45.

(9) A turbocharger 100 according to at least one embodiment of the present disclosure includes: a turbine impeller 103 attached to one end of a rotational shaft 2; a compressor impeller 105 attached to another end of the rotational shaft 2; and a thrust bearing device 1 having any one of the above configurations (1) to (8).

According to the above configuration (9), since the thrust bearing device 1 having any one of the above configurations (1) to (8) is included, excellent transient response of the turbocharger 100 can be achieved while ensuring the durability of the turbocharger 100.

REFERENCE SIGNS LIST

1 Thrust bearing device
2 Rotational shaft
3 Compressor-side thrust collar (Collar member)
4 Thrust member
9 Turbine-side thrust collar (Collar member)
10 First thrust surface
11 Outer peripheral edge
12 Conical surface
13 First outer peripheral position
15 Inner peripheral edge
17 First inner peripheral position
18 Second inner peripheral position
20 Second thrust surface
21 First radial position
22 Second radial position
25 Recess
27 Region
32 Flange portion
41 Insertion hole
45 Annular groove
92 Flange portion
100 Turbocharger
103 Turbine impeller
105 Compressor impeller
200 Pad
211 Recess
213 Outer weir portion
215 Inner weir portion
217 Connecting hole
219 Land portion
310 Compressor-side first thrust surface
430 Compressor-side second thrust surface
490 Turbine-side second thrust surface
910 Turbine-side first thrust surface

The invention claimed is:
1. A thrust bearing device, comprising:
a rotational shaft;
a collar member fitted to the rotational shaft and having a first thrust surface; and
a thrust member having an insertion hole into which the rotational shaft is inserted and a second thrust surface which is disposed around the insertion hole and faces the first thrust surface of the collar member, wherein the first thrust surface includes an annular flat surface or a conical surface formed around an entire circumference of the collar member, and is configured to be inclined with respect to a plane perpendicular to an axis of the rotational shaft so that a distance between the annular flat surface or the conical surface and the second thrust surface periodically increases and decreases with rotation of the rotational shaft.

2. The thrust bearing device according to claim 1, wherein when an angular position where a first outer peripheral position exists is defined as a first angular position, where the first outer peripheral position is a position of an outer peripheral edge of the first thrust surface having the smallest distance from the second thrust surface, and a virtual line passing through a first inner peripheral position and a second inner peripheral position is defined as a first virtual line, where the first inner peripheral position is an inner peripheral edge of the first thrust surface in the first angular position, and the second inner peripheral position is an inner peripheral edge of the first thrust surface in a second angular position which is 180 degrees different from the first angular position, in a cross-section including the first virtual line and the axis of the rotational shaft, the first thrust surface is configured such that the first outer peripheral position is disposed on an opposite side of the first virtual line from the second thrust surface.

3. The thrust bearing device according to claim 2, wherein the first thrust surface includes the conical surface formed so as to slide on the second thrust surface.

4. The thrust bearing device according to claim 1, wherein when a radial position of the second thrust surface facing an outer peripheral edge of the first thrust surface is defined as a first radial position, and an innermost radial position of the second thrust surface is defined as a second radial position, the second thrust surface is farther from the first thrust surface in the first radial position than in the second radial position.

5. The thrust bearing device according to claim 4, wherein the second thrust surface is closer to the first thrust surface in at least a part of a region disposed radially outward of the first radial position than in the first radial position.

6. The thrust bearing device according to claim 1, wherein the thrust member is provided with a plurality of recesses, a plurality of outer weir portions formed on a radially outer side in the recesses, and a plurality of inner weir portions formed on a radially inner side in the recesses, which are arranged on the second thrust surface in a circumferential direction.

7. The thrust bearing device according to claim 6, wherein each of the plurality of recesses is connected to the insertion hole via a connecting hole, and wherein each connecting hole is offset from a center position of the recess in a circumferential direction of the rotational shaft to an upstream side in a rotational direction of the rotational shaft.

8. The thrust bearing device according to claim 1, wherein the thrust member has an annular groove extending in a circumferential direction on the second thrust surface, and wherein a diameter of an inner peripheral edge of the annular groove is smaller than a diameter of an outer peripheral edge of the first thrust surface, and a diameter of an outer peripheral edge of the annular groove is larger than the diameter of the outer peripheral edge of the first thrust surface.

9. A turbocharger, comprising:

a turbine impeller attached to one end of the rotational shaft;

a compressor impeller attached to another end of the rotational shaft; and the thrust bearing device according to claim 1.

* * * * *